US011516238B2

(12) United States Patent
Niazi

(10) Patent No.: US 11,516,238 B2
(45) Date of Patent: Nov. 29, 2022

(54) SYSTEMS AND METHODS FOR MONITORING USER ACTIVITIES

(71) Applicant: BANK OF MONTREAL, Toronto (CA)

(72) Inventor: Razieh Niazi, Toronto (CA)

(73) Assignee: BANK OF MONTREAL, Toronto (CA)

(*) Notice: Subject to any disclaimer, the term of this patent is extended or adjusted under 35 U.S.C. 154(b) by 290 days.

(21) Appl. No.: 16/989,497

(22) Filed: Aug. 10, 2020

(65) Prior Publication Data

US 2021/0051166 A1 Feb. 18, 2021

Related U.S. Application Data

(60) Provisional application No. 62/887,365, filed on Aug. 15, 2019.

(51) Int. Cl.
*H04L 9/40* (2022.01)
*G06F 16/182* (2019.01)

(52) U.S. Cl.
CPC ........ *H04L 63/1425* (2013.01); *G06F 16/182* (2019.01)

(58) Field of Classification Search
CPC .................. H04L 63/1425; G06F 21/554
See application file for complete search history.

(56) References Cited

U.S. PATENT DOCUMENTS

| 10,938,846 | B1* | 3/2021 | Hsiao | G06F 21/554 |
| 2014/0114824 | A1* | 4/2014 | Kong | G06Q 10/1091 |
| | | | | 705/32 |
| 2020/0028876 | A1* | 1/2020 | Cohen | H04L 63/1425 |

FOREIGN PATENT DOCUMENTS

| CN | 110298557 | * 10/2019 |
| JP | 2005228192 | * 8/2005 |

* cited by examiner

*Primary Examiner* — Barbara B Anyan
(74) *Attorney, Agent, or Firm* — Foley & Lardner LLP

(57) ABSTRACT

Disclosed herein are embodiments of systems, methods, and products comprises a server for monitoring and tracking user activities based on different events in a security log. The server may retrieve the security log and parse the security log to identify a set of predetermined events for a user based on the event IDs, including logon events, logoff events, and privileged events. Based on the time point when privileged events occur at least partially during the pattern of having more logon events than logoff events, the server may determine when the user starts to work. Based on the time point when the logoff events and logon event starts to show the pattern that there are more logoff events than logon events and the difference increasing into a threshold, the server may determine when the user stops working. The server may generate a heat map indicating different users' work time length.

20 Claims, 5 Drawing Sheets

SYSTEMS AND METHODS FOR MONITORING USER ACTIVITIES

CROSS REFERENCE TO RELATED APPLICATIONS

This application claims priority to U.S. Provisional Application No. 62/887,365, filed Aug. 15, 2019, which is incorporated by references in its entirety for all purposes.

TECHNICAL FIELD

This application relates generally to methods and systems for monitoring user activities through security log.

BACKGROUND

Security log records logon/logoff activities or other security-related activities specified by the system's audit policy. Administrators usually use the security log to detect and investigate attempted accesses or successful logins. Although the logon/logoff events provide useful information about account activities, it is difficult to track user activities and further determine the user's actual work time based on the logon/logoff information in the security log.

When a user is authenticated to a system, the system may generate an account logon. These events are logged in a security log. A system may support two kinds of accounts: domain accounts and local accounts. Users can use a domain account to log on after which a user accesses a shared folder on a file server, which may generate both domain account logon and local account logon events. The security log may record every successful logon with the same event ID (e.g., event ID 4624). For example, in the security log, there may be two events with same event ID 4624 for the domain account logon and the local account logon.

Furthermore, there are many other logon events with the same event ID for other logon activities. For example, whenever the user accesses a shared folder on a file server, the user obtains a network logon session. The network logon generates a logon/logoff event in the domain controller's security log. After a user logging on to a workstation or member servers of a file server, the user reconnects to share folders on the file server. The user may also obtain a logon session/network session. It is not the case that the network logon session begins when the user logs on (connects to the shared folder) and ends when the user logs off. Instead, the file server may keep the network logon session alive for as long as the user has a file open on the file server. The same user account may have repeated logon/logoff event on the file server throughout the day. Hence, on the domain controller there are one or more logon/logoff pair events generated immediately following authentication events. These events are generated constantly and are symmetric.

However, these events may not directly indicate the user activity. Instead, the group policy client (an account management utility) installed in the system may generate these events. The system refreshes the group policy every 90 minutes. Based on the refreshing, there will be a network logon and logoff on the domain controller. These logon/logoff events are a huge source of noise on domain controllers because every computer and every user must frequently refresh group policy.

Furthermore, after the initial authentication to the domain controller, the user also obtains a service ticket for every computer the user logs onto, including the workstation, the domain controller itself, and any member servers in connection with the shared folder access. As the computers remain up and running and user remain logged on, the tickets may expire and be renewed, which may generate further account logon events on the domain controller.

Tracking a user's logon/logoff activities in server security log is difficult. For example, the server may register event ID (identifier) 4624 in the security log when an account successfully logs on and register event ID 4634 when an account logs off. When the policy is enabled on a domain controller, the domain controller may log all domain account authentications that occur on that domain controller. Indeed, the domain controller security log may contain many logon/logoff events that are generated by computer/server accounts as opposed to user accounts. Determining whether a user has logged on or logged off is not as simple as monitoring whether an event ID 4624 or 4634 is registered.

It is even more difficult to track a user's logoff activity (the time when the user stopped working) based on event ID 4634. For example, if a user turns off his/her computer, the system may not have an opportunity to log the logoff event until system restarts. Therefore, some logoff events are logged much later than the time at which they actually occurred. The logoff event does not necessarily indicate the time that the user has stopped using the system. In another example, if the computer shuts down or loses network connectivity, the computer may not record a logoff event at all.

FIG. 1 shows an example 100 of the logon/logoff events associated with a user computer for a day based on the security log. The x-axis shows the hours of the day and the y-axis shows the number of active events. The curve 102 shows the number of running events during 24 hours of a day for a user. According to the figure, there are running events throughout the day from 00:00 to 24:00. However, the user is not actively working in front of the computer for 24 hours a day. Therefore, the logon/logoff events in the security log does not directly correspond to the user activities.

Because the security log includes information for many logon/logoff events that are not directly related to the user activities, it is a challenge to determine user activities and work time based on the security log.

SUMMARY

For the aforementioned reasons, what is needed is a system and method to determine user activities and further determine the hours the user is working based on the security log. Embodiments disclosed herein address the above challenges by providing a system and method for exploring the events in the security log to determine user activities and further determine user work time.

Discussed herein are systems and methods for parsing the security log and identifying a set of predetermined events for a user based on the event IDs, including logon events, logoff events, and privileged events; determining one or more patterns for the set of predetermined events during different time periods; determining when the user starts to work and when the user stops working based on the event patterns; and generating heat map indicating each user's work time.

Specifically, based on the fact that different user activities may lead to different patterns on the logon/logoff events, the analytic server may explore such patterns to determine the user activities. A set of privileged events occurring at least partially during the pattern of having more logon events than logoff events in a certain period may indicate that a user account logs on and the user is actively working. Privileged events indicate that the specific user logs on, accesses the shared folder in the file server, and starts working. Based on the time point when privileged events occur at least partially during the pattern of having more logon events than logoff events, the analytic server may determine when the user starts to work. A privileged event, as used herein, may refer to any user action event (e.g., actions performed by a user or the user's computer that are associated with the user's account or any actions performed by the user and/or the user's computer that can be used as an indication of the user performing an action while logged in). For example, a user accessing a file in a shared file folder may be considered a privileged event. The server may use a predefined list of event to identify a privileged event and/or may use predetermined rules to analyze the user action event/privileged event.

Based on the time point when the logoff events and logon event starts to show the pattern that there are more logoff events than logon events and the difference increasing into a threshold, the server may determine when the user stops working. The server may generate a heat map indicating different users' work time length of each day for a certain period.

In one embodiment, a method comprises periodically intercepting, by a server, data packets communicated between a computer of a user and a file server of an entity to generate a security log associated with interactions between the computer of the user and the file server; identifying, by the server, a set of predetermined events for the user from the security log by parsing the security log based on event identifiers, the set of predetermined events correspond to logon events, logoff events, and privileged events of operations on a privileged object in the file server; determining, by the server, one or more patterns for the set of predetermined events during different time periods, where a first pattern corresponds to a number of the logon events being greater than a number of the logoff events during a first time period, a number of the privileged events occurring at least partially during the first pattern of the number of logon events being greater than the number of logoff events during the first period, and a first maximum difference between the number of the logon events and the number of the logoff events satisfying a first threshold, and where a second pattern corresponds to the number of the logoff events being greater than the number of the logon events during a second time period and a second maximum difference between the number of the logoff events and the number of the logon events satisfying a second threshold; determining, by the server, a starting point of the user's work time as a first time when the number of the privileged events satisfying a third threshold occur at least partially during the first pattern of the number of logon events being greater than the number of logoff events during the first period; and determining, by the server, an ending point of the user's work time as a second time when the logoff events and the logon events diverge into the second pattern; calculating, by the server, a length of work time for the user based on the starting point and the ending point of the user's work time; and dynamically populating, by the server, a heat map indicating the length of work time of the user in a predetermined time interval.

In another embodiment, a system comprises a computer of a user, a file server of an entity, a server in communication with the computer and the file server and configured to: periodically intercept data packets communicated between the computer of the user and the file server of the entity to generate a security log associated with interactions between the computer of the user and the file server; identify a set of predetermined events for the user from the security log by parsing the security log based on event identifiers, the set of predetermined events correspond to logon events, logoff events, and privileged events of operations on a privileged object in the file server; determine one or more patterns for the set of predetermined events during different time periods, where a first pattern corresponds to a number of the logon events being greater than a number of the logoff events during a first time period, a number of the privileged events occurring at least partially during the first pattern of the number of logon events being greater than the number of logoff events during the first period, and a first maximum difference between the number of the logon events and the number of the logoff events satisfying a first threshold, and where a second pattern corresponds to the number of the logoff events being greater than the number of the logon events during a second time period and a second maximum difference between the number of the logoff events and the number of the logon events satisfying a second threshold; determine a starting point of the user's work time as a first time when the number of the privileged events satisfying a third threshold occur at least partially during the first pattern of the number of logon events being greater than the number of logoff events during the first period; and determine an ending point of the user's work time as a second time when the logoff events and the logon events diverge into the second pattern; calculate a length of work time for the user based on the starting point and the ending point of the user's work time; and dynamically populate a heat map indicating the length of work time of the user in a predetermined time interval.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
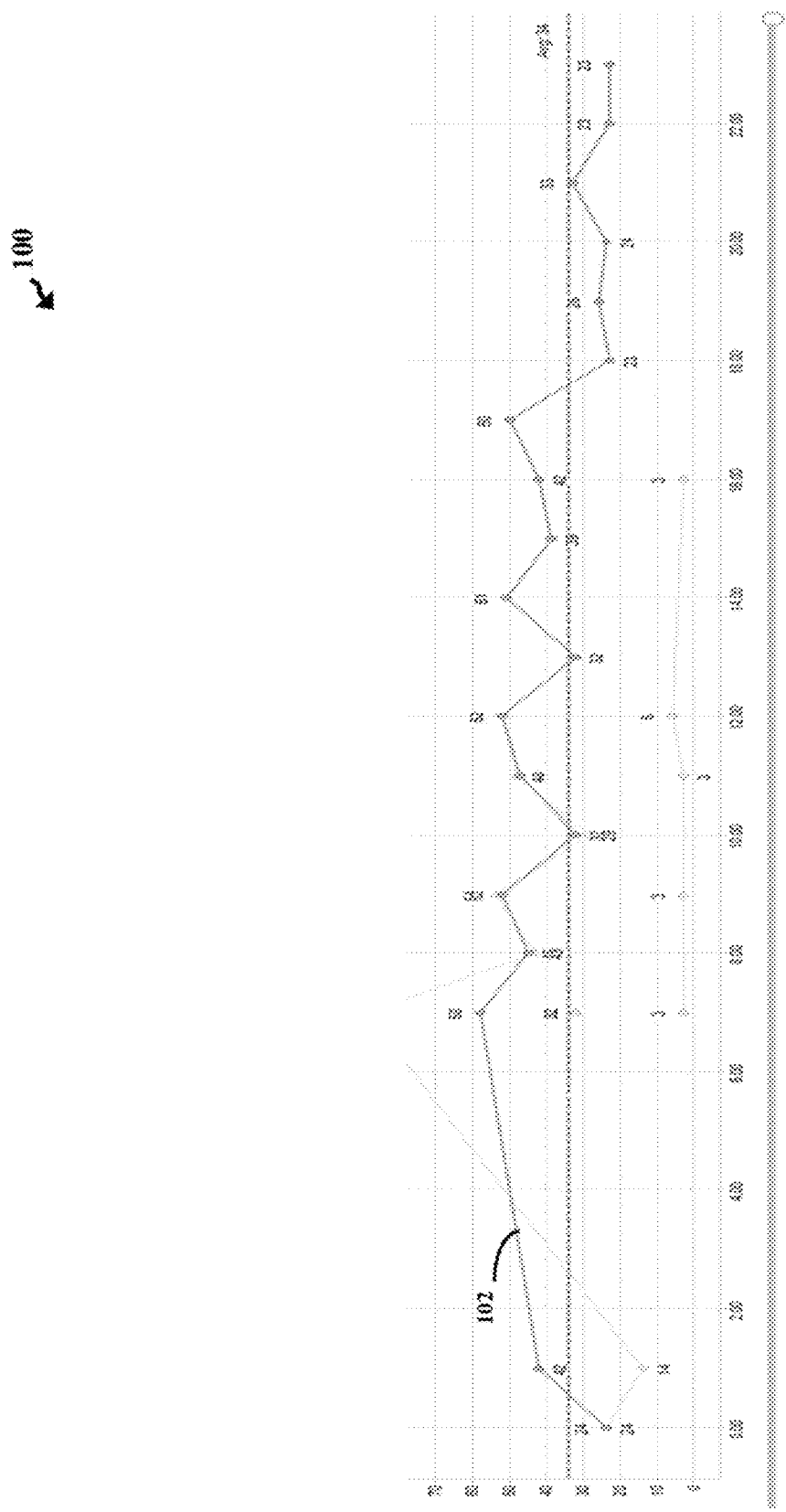
FIG. 1 illustrates an example of logon/logoff events associated with a user computer for a day based on security log, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein provide a system and method for determining user activities and user work time based on different events in a security log. Specifically, an analytic server may parse the security log and identify a set of predetermined events for a user based on the event IDs. The analytic server may identify logon events, logoff events, and privileged events. The analytic server may explore different patterns for these events. For example, in a first period of time, there may be more logon events than logoff events. In a second period of time, there may be more logoff events than logon events. This is because if the user opens no files or there is no other activities occurring on the network connection, the file server may close the logon sessions after a predetermined period of time to conserve resources. As soon as the user has activities, the file server may open new logon sessions. Based on the fact that different user activities may lead to different patterns on the logon/logoff events, the analytic server may explore such patterns to determine the user activities.

A set of privileged events occurring at least partially during the pattern of having more logon events than logoff events in a certain period may indicate that a user account logs on and the user is actively working. Privileged events indicate that the specific user exercises the user's right specified in the privileges field, which may indicate that the user logs on and is accessing the shared folder in the file server. Having more logon events than logoff events may indicate the user account is active, which may further indicate that the user is accessing the shared folder in the file server and actively working. Thus, based on the time point of privileged events that occur at least partially during the pattern of having more logon events than logoff events, the analytic server may determine the starting point of the user's work time.

The pattern that there are more logoff events than logon events and the difference between the number of logoff events and the logon events increasing into a threshold may indicate that the user has been inactive or stopped working. The analytic server may determine the ending point of the user's work time as the time point when the logoff events and logon event starts to show this pattern.

The analytic server may determine the length of the user's work time based on the starting point of the ending point of the user's work time. The analytic server may then generate a heat map indicating different users' work time length of each day for a certain period. The analytic server may keep monitoring and tracking the users' work time and dynamically update the heat map.

Figure 2:
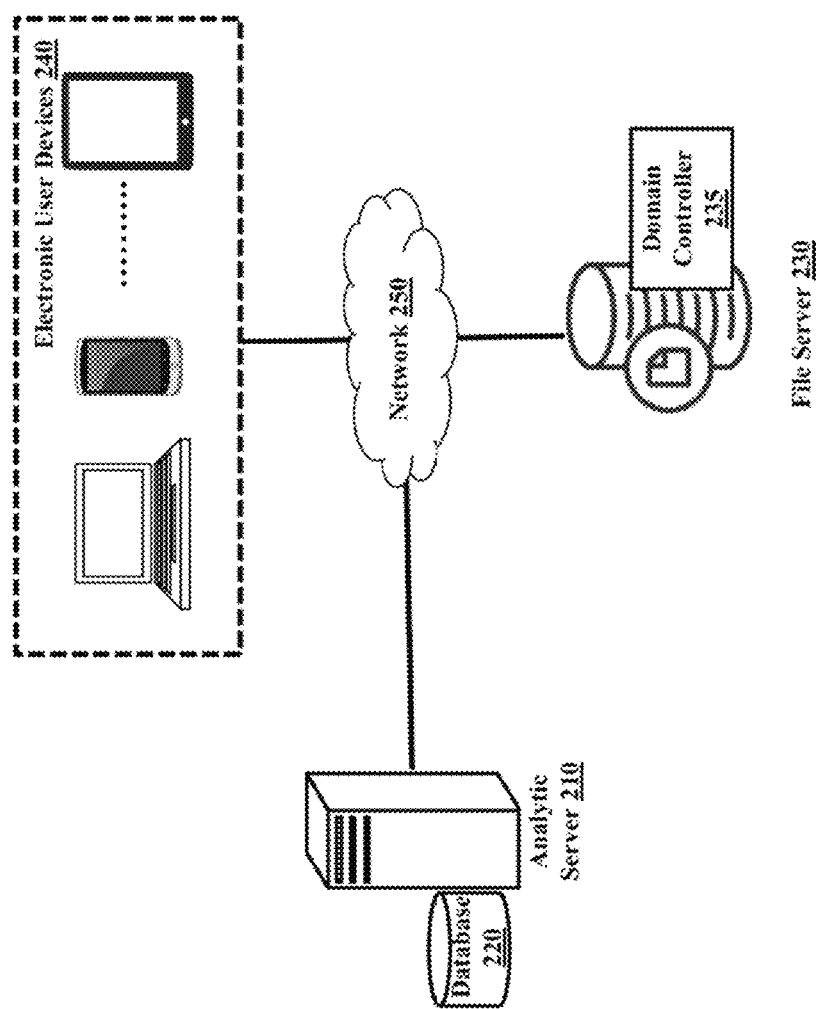
FIG. 2 illustrates a computer system for monitoring user activities through security log, according to an embodiment.

FIG. 2 illustrates components of a system 200 for monitoring user activities through security log, according to an embodiment. The system 200 may comprise an analytic server 210, a database 220, a set of electronic user devices 240, and a file server 230 that are connected with each other via hardware and software components of one or more networks 250. Examples of the network 250 include, but are not limited to, Local Area Network (LAN), Wireless Local Area Network (WLAN), Metropolitan Area Network (MAN), Wide Area Network (WAN), and the Internet. The communication over the network 250 may be performed in accordance with various communication protocols, such as Transmission Control Protocol and Internet Protocol (TCP/IP), User Datagram Protocol (UDP), and IEEE communication protocols.

The analytic server 210 may be any computing device comprising a processor and other computing hardware and software components. The analytic server 210 may be logically and physically organized within the same or different devices or structures, and may be distributed across any number of physical structures and locations (e.g., cabinets, rooms, buildings, cities).

The analytic server 210 may be a computing device comprising a processing unit. The processing unit may include a processor with computer-readable medium, such as a random access memory coupled to the processor. The analytic server 210 may be running algorithms or computer executable program instructions, which may be executed by a single processor or multiple processors in a distributed configuration. The analytic server 210 may be configured to interact with one or more software modules of a same or a different type operating within the system 200.

Non-limiting examples of the processor may include a microprocessor, an application specific integrated circuit, and a field programmable object array, among others. Non-limiting examples of the analytic server 210 may include a server computer, a workstation computer, a tablet device, and a mobile device (e.g., smartphone). Some embodiments may include multiple computing devices functioning as the analytic server 210. Some other embodiments may include a single computing device capable of performing the various tasks described herein.

The analytic server 210 may be connected to the file server 230 via the network 250. The analytic server 210 may retrieve the security log from the file server 230 and determine the user's activities based on the security log. The security log may be a log that contains records of many different security events occurred on the file server 230, including logon/logoff activities or other security-related events on the file server 230. The security log may include user name, computer name, and computer IP address of the events, the category and the timestamp of the logon/logoff events and other security-related events.

The set of electronic user devices 240 may be any computing device allowing a user to access the file server 230. The electronic user devices 240 may be any computing device comprising a processor and non-transitory machine-readable storage medium. The examples of the computing device may include, but are not limited to, a desktop computer, a laptop, a personal digital assistant (PDA), a smartphone, a tablet computer, and the like. The electronic user devices 240 may comprise any number of input and output devices supporting various types of data, such as text, image, audio, video, and the like.

The file server 230 may be any computing device comprising a processor and other computing hardware and software components. The file server 230 may be associated with an entity (e.g., company, organization) and provide resources for backup, store, edit and other work with files. The file server 230 may also run applications for various purposes, including user initiated applications and system management applications. The file server 230 may comprise one or more member servers. A user operating the electronic user device 240 may access the file server 230 over the network 250 for various activities and tasks. The user's activities (from system access to file access) may generate events on the security log of the file server 230. In some embodiments, the security log may be located in the electronic user devices 240 or the analytic server 210.

The file server 230 may comprise a domain controller 235. The domain controller 235 may be a server computer that responds to security authentication requests (e.g., logging in, checking permissions, etc.) within a domain. A domain describes a collection of users, systems, applications, networks, database server, and any other resources that are administrated with a common set of rules. The domain controller 235 may manage network security, effectively acting as the gatekeeper for user authentication and authorization. The domain controller 235 may be responsible for granting a user access to a number of computer resources on the file server 230 based on a single username and password combination.

The file server 230 may maintain the security log via the domain controller by recording all the logon/logoff events occurred on the file server, including domain account logon session, local account logon session generated by both user and computer/server. For example, after a user logs into a user account of a system, the domain controller 235 may generate an account logon event. In the meantime, the user may also obtain a service ticket for every computer the user logs onto, including the workstation, the domain controller 235 itself, and any member servers of the file server 230. The tickets may expire and be renewed, which may generate account logon event in the security log. Furthermore, the system may refresh periodically, which may also generate network logon and logoff events. As a result, the security log may include many logon/logoff events generated from automatic system refreshing and ticket updating. The security log may also include logon/logoff events generated from user activities, as the user logs on (connects and accesses shared folders on the file server) and logs off.

The analytic server 210 may retrieve the security log from the file server 230 and determine the user's activities based on the events included in the security log. In some embodiments, the analytic server 210 may periodically intercept data packets communicated between the electronic user device 240 and the file server 230 to generate the security log associated with interactions between electronic user device 240 and the file server 230. For example, the analytic server 210 may check the header and/or the payload of the data packet to determine the timestamp, the event ID, and the user ID and generate an event record for the use in the security log.

The analytic server MO may identify and extract the events related with user activities from the many events included in the security log. The analytic server 210 may determine one or more patterns for the extracted events related with user activities. The analytic server 210 may track and monitor user activities by exploring the event patterns. The analytic server 210 may further determine the user's work time (hours the user is working) based on the user activities. The analytic server 210 may then generate a heat map indicating different users' work time length of each day for a certain period. The analytic server 210 may keep monitoring and tracking the users' work time and dynamically update the heat map.

The analytic server 210 may save the data of user activities into the database 220. The analytic server may also generate graphical representation of the data to illustrate each user's activities and work time. For example, the analytic server 210 may generate a heat map including the work time of each user for a certain time period (e.g., a month).

The database 220 may be any non-transitory machine-readable media configured to store the user activity data. For example, data in database 220 may comprise the user identifier (ID), such as user name, date, a starting time and an ending time indicating the time the user starts and stops working for a specific day, the period of work time of the user in a specific day, and any other information about the user activities. The database 220 may be part of the analytic server 210. The database 220 may be a separate component in communication with the analytic server 210. The database 220 may have a logical construct of data files, which may be stored in non-transitory machine-readable storage media, such as a hard disk or memory, controlled by software modules of a database program (e.g., SQL), and a database management system that executes the code modules (e.g., SQL scripts) for various data queries and management functions.

Figure 3:
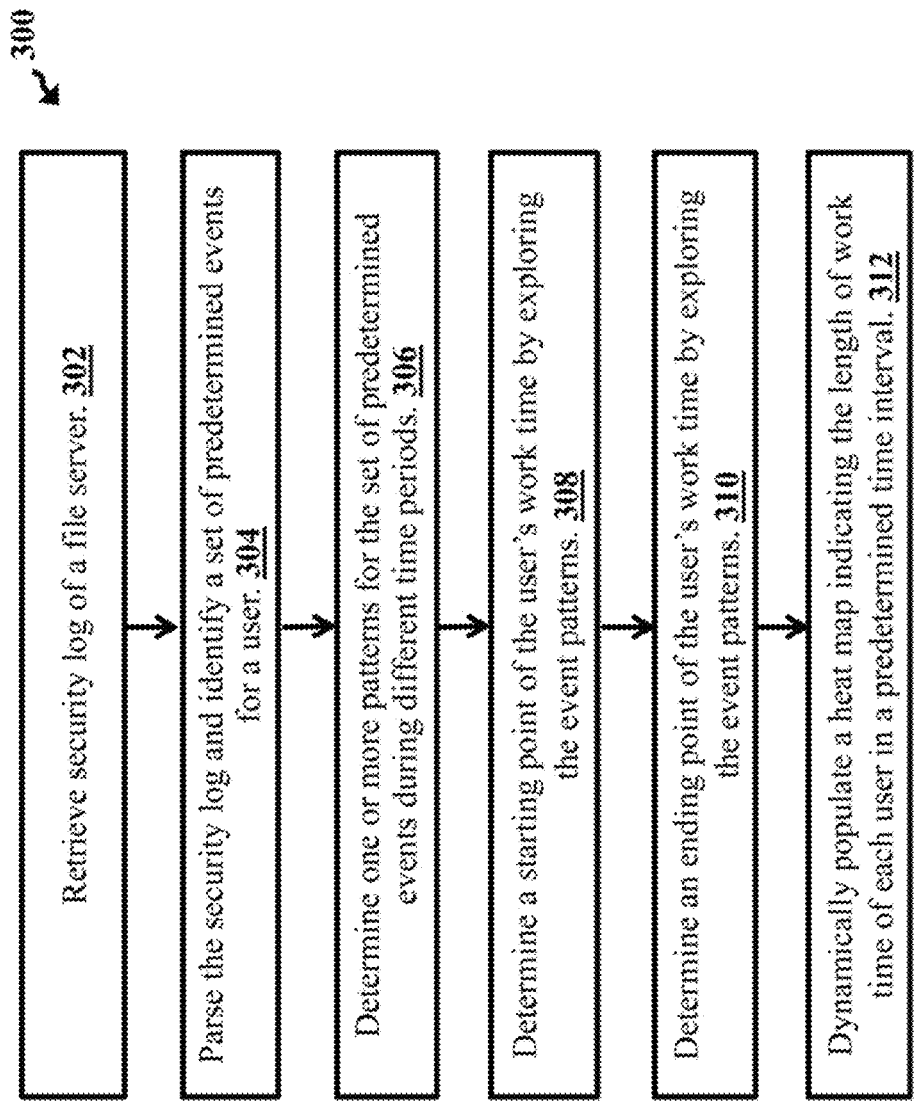
FIG. 3 illustrates a flowchart depicting operational steps for monitoring user activities through security log, according to an embodiment.

FIG. 3 illustrates execution of a method 300 for user monitoring, according to an embodiment. Other embodiments may comprise additional or alternative steps, or may omit some steps altogether.

At step 302, the analytic server may retrieve the security log of a file server. The security log may be a log that contains records of many different security events occurred on the file server, including logon/logoff activities or other security-related events on the file server. Administrators may use the security log to detect and investigate attempted activities and to troubleshoot problems. The security log may include user name, computer name, and computer IP address of the events, the category and the timestamp of the logon/logoff events and other security-related events.

The file server may maintain the security log by recording all the logon/logoff and any other events occurred on the file server, including domain account logon session, local account logon session generated by both user and computer/server. For example, the security log may include many logon/logoff events generated from automatic system refreshing and ticket updating. The security log may also include logon/logoff events generated from user activities, as the user logs on (connects and accesses shared folders on the file server) and logs off.

In some embodiments, the analytic server may periodically intercept data packets communicated between a computer of a user and the file server to generate the security log associated with interactions between the user computer and the file server. For example, the analytic server may check the header and/or the payload of the data packet to determine the timestamp, the event ID, and the user ID and generate a corresponding event record for the use in the security log.

At step 304, the analytic server may parse the security log and identify a set of predetermined events for a user based on event IDs. The set of predetermined events may correspond to logon events, logoff events, and privileged events with operations on a privileged object in the file server. The analytic server may track and monitor user activities and further determine the user's work time (hours the user is working). To track the user activities, the analytic server may need to identify and extract the events related with user activities from the many events included in the security log. For a specific user, the analytic server may identify three kinds of events with event IDs 4624, 4634, and 4674. For example, the analytic server may parse the security log and retrieve events with these event IDs for a particular user based on the user logon ID (e.g., user name and/or user computer name).

These events are related with user activities. Event ID 4624 means that an account successfully logs on. Event ID 4624 documents every successful attempt at logging on to the file server. Event ID 4624 may include logon events for all types of logons. Event ID 4634 means that an account logs off. This event shows that logon session was terminated and no longer exists. This event signals the end of a logon session and can be correlated back to the logon event ID 4624 using the logon ID. However, there is no hard correlation code shared between these events. Event ID 4674 means that an operation was attempted on a privileged object. Event ID 4674 indicates that the specific user exercises the user's right specified in the privileges field, which may indicate that the user is accessing the shared folder and is working. The existence of a privilege field may also indicate that the user is logged in because the privileged action was performed (e.g., because a user with certain privileges can execute the indented event). To identify the privileged fields, the analytic server may use various predetermined thresholds and rules. For instance, different data records may include an identifier indicating whether the data record is privileged or not.

At step 306, the analytic server may determine one or more patterns for the set of predetermined events during different time periods. Based on the timestamp and the event ID, the analytic server may determine the number of the different events at a particular time (e.g., at each hour). The analytic server may further determine the patterns of the different events during various time periods. The identified three kinds of events may show certain patterns because of user activities. The analytic server may determine a correlation between user activities and the patterns of different events. The analytic server may explore such patterns to determine the user's work time.

Figure 4:
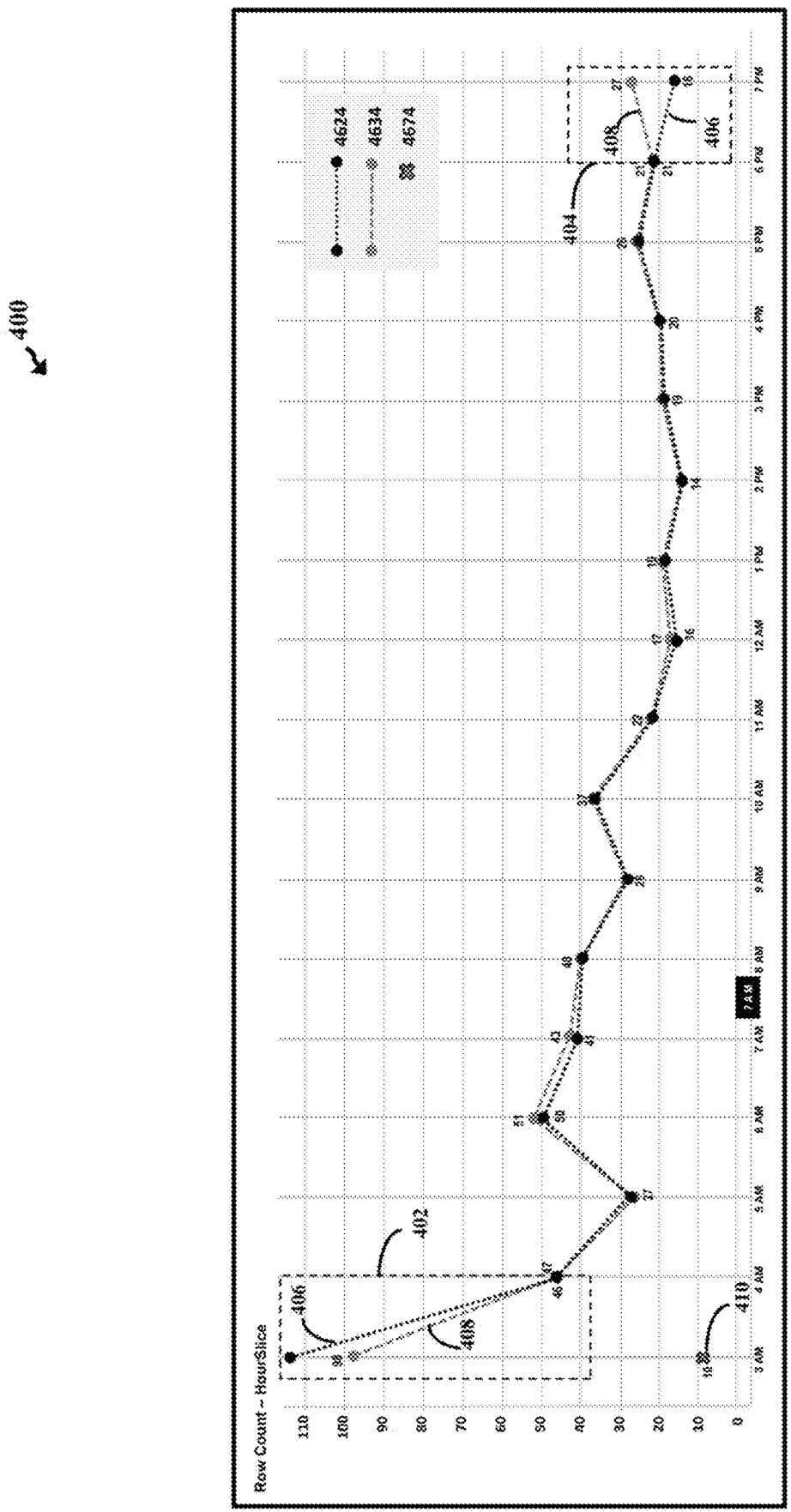
FIG. 4 illustrate the number of different events at different hours of a day for a user, according to an embodiment.

One of the patterns may include that the logon and logoff events are symmetric and repeated constantly most of the time. FIG. 4 illustrates the number of different events 400 at different hours of a day for a user. A first curve 406 represents the number of logon events (with event ID 4624) at different hours. A second curve 408 represents the number of logoff events (with event ID 4634) at different hours. As shown in FIG. 4, the first curve 406 and the second curve 408 are close to each other for most time. Thus, the number of the logon events is the same (or almost the same) as the number of the logoff events for most time of the day, such as from around 4 AM to 6 PM. This pattern shows that the logon and logoff events are symmetric.

However, for a certain amount of time, the logon events and logoff events are not symmetric. For example, in a first asymmetric pattern 402 from around 3 AM to 4 AM, following a set of events with event ID 4674 at 3 AM, the number of logon events is greater than the number of logoff events (e.g., curve 406 is above curve 408). The maximum difference between the number of logon events and the number of logoff events satisfies a first threshold. Thus, a first pattern corresponds to a number of the logon events being greater than a number of the logoff events during a first time period, a number of the privileged events during the first pattern of the number of logon events being greater than the number of logoff events during the first period, and a first maximum difference between the number of the logon events and the number of the logoff events satisfying a first threshold. For instance, the privileged events may occur at the beginning of the first time period during which the number of logon events are greater than the number of logoff events.

In a second asymmetric pattern 404 from around 6 PM to 7 PM, the number of logoff events is greater than the number of logon events (e.g., curve 408 is above curve 406) and the maximum difference between the number of logoff events and the number of logon events satisfies a second threshold. For example, the difference increases into a second threshold. These patterns may indicate different user activities. Thus, a second pattern corresponds to the number of the logoff events being greater than the number of the logon events during a second time period and a second maximum difference between the number of the logoff events and the number of the logon events satisfying a second threshold User activities may cause the asymmetric patterns. Specifically, if the user opens no files or there is no other activities occurring on the network connection, the file server may close the logon sessions after a predetermined period of time to conserve resources. As soon as the user has activities, the file server may open new logon sessions. As a result, when there is no user activities or when the user logs off, there are more logoff events (e.g., event ID 4634) than logon events (e.g., event ID 4624), such as in the second pattern 404. Likewise, when there is a user logon activity, there are more logon events than logoff events, such as in the first pattern 402. Based on the fact that different user activities may lead to different patterns on the logon/logoff events, the analytic server may explore such patterns to determine the user activities.

At step 308, the analytic server may determine the starting point of the user's work time by exploring the event patterns. As discussed above, in a first asymmetric pattern, following a set of privileged events with event ID 4674 at a particular time point, there are more logon events than logoff events and the maximum difference between the logon events and the logoff events satisfies a threshold. This pattern of having more logon events than logoff events in a certain period may indicate that a user account is active. To determine the exact time when the user starts to do real work, the analytic server may identify the privileged events with event ID 4674. Event ID 4674 indicates that the specific user exercises the user's right specified in the privileges field. In order to logon, the user may need to exercise his/her privileged right. Thus, the time point of the privileged events (e.g., event ID 4674) may indicate when the user logs on. After the privileged events (e.g., event ID 4674), the pattern of having more logon events than logoff events in a certain period may indicate that the user account is active, which may further indicate that the user is accessing the shared folder in the file server and actively working. Thus, based on the time point of event ID 4674, the analytic server may determine the starting point of the user's work time.

As shown in FIG. 4, following the privileged events (e.g., event ID 4674) at 3 AM, there are more logon events than logoff events in the first pattern 402 from 3 AM to 4 AM. The privileged events (e.g., event ID 4674) at 3 AM means that the user account logs on at 3 AM and accesses the shared folder. Because there are more logon events than logoff events following the privileged events, the analytic server may determine that the user account is active. The user account being active and accessing the shared folder is an indication that the user is working on the documents in the shared folder. The analytic server may determine that the user starts working at the time point when the user exercises the privileged right (e.g., event ID 4674) and is actively accessing the shared folder. In this example, the analytic server may determine that the user starts working at 3 AM.

Therefore, the analytic server may determine the starting point of the user's work time based on privileged events that satisfy a threshold. The analytic server may determine the starting point of the user's work time as a time when a number of the privileged events satisfying a threshold during the first pattern of the number of logon events being greater than the number of logoff events during the first period. For example, as shown in figure, the starting point of work time is the point when privileged event curve 410 (the event ID 4674 curve) starts to overlap with the logon event curve 406 (event ID 4624 curve) and the logoff curve 408 (event ID 4634 curve) during a period the logon event curve 406 is above the logoff event curve 408 (e.g., more logon events than logoff events).

At step 310, the analytic server may determine an ending point of the user's work time by exploring the event patterns. As discussed above, in the second asymmetric pattern, there are more logoff events than logon events and the difference between the logoff events and the logon events increases into a threshold. This pattern may indicate the user stops working. The analytic server may determine the ending point of the user's work time as a time when the logoff events and the logon events diverge into the second asymmetric pattern.

The file server may generate more logoff events by closing logon sessions associated with the user computer after the user has been inactive for a predetermined period of time. Specifically, if the user opens no files or there is no other activities occurring on the network connection, the file server may close the logon sessions after a predetermined period of time to conserve resources. This fact may result in the pattern that there are more logoff events than logon events after the user has been inactive for a predetermined period of time. Because the user having been inactive for a certain period may indicate that the user stops working, the analytic server may determine that the ending point of the user's work time is the time when the logon/logoff events start to show such a pattern. Furthermore, the analytic server may not only look for the pattern where there are more logoff events than logon events, but also determine if the maximum difference satisfies a threshold.

In operation, the analytic server may look for the pattern that there are more logoff events than logon events and the difference increases into a threshold value. For example, as shown in FIG. 4, in the second pattern 404, the logon event curve 406 and the logoff curve 408 diverge at 6 PM with the logoff event curve 408 being above the logon event curve 406 (e.g., more logoff events than logon events). The distance between these two curves keeps increasing to a value that satisfies a threshold. In this case, the distance between the two curves keeps increasing without any trend of converging. The analytic server may determine that the user stops working at the time of 6 PM when the logon/logoff events start to show the second asymmetric pattern.

The threshold may be a predetermined value obtained based on historic data. The analytic server may determine that the user logs off when the number of logoff events is larger than the number of logon events and the difference between the number of logoff events and the number of logon event increases to a value that satisfies the threshold. If the difference is less than a threshold, it may be due to normal system operation where the user or the computer closes some of the logon sessions and/or due to some idle time.

At step 312, the analytic server may dynamically populating a heat map indicating the length of work time of each user in a predetermined time interval. After determining the starting point and the ending point of a user's work time during different hours of a day, the analytic server may calculate the length of work time for each user based on the starting point and the ending point. The analytic server may then generate and populate a heat map indicating different users' work time length of each day for a certain period (e.g., a month). The analytic server may keep monitoring and tracking the users' work time and dynamically update the heat map in a predetermined time period. For example, the analytic server may update the heat map every hour, or every day, or in any other time intervals.

In some embodiments, the analytic server may further determine project identifiers associated with the user (e.g., the projects the user is working on) during the user's work time. The analytic server may access one or more document management tools that record the user's activity history. The analytic server may retrieve the user's activity history and further determine the IDs of the documents, files, workstations the user has accessed or edited and the timestamps the user has accessed these documents, files, workstations. Based on the embodiments described herein, the analytic server can determine when the user starts working and when the user stops working during different hours of the day. By combing the working hours and the accessed documents IDs and the accessing timestamps, the analytic server may determine the projects the user is working on during his/her work time.

Figure 5:
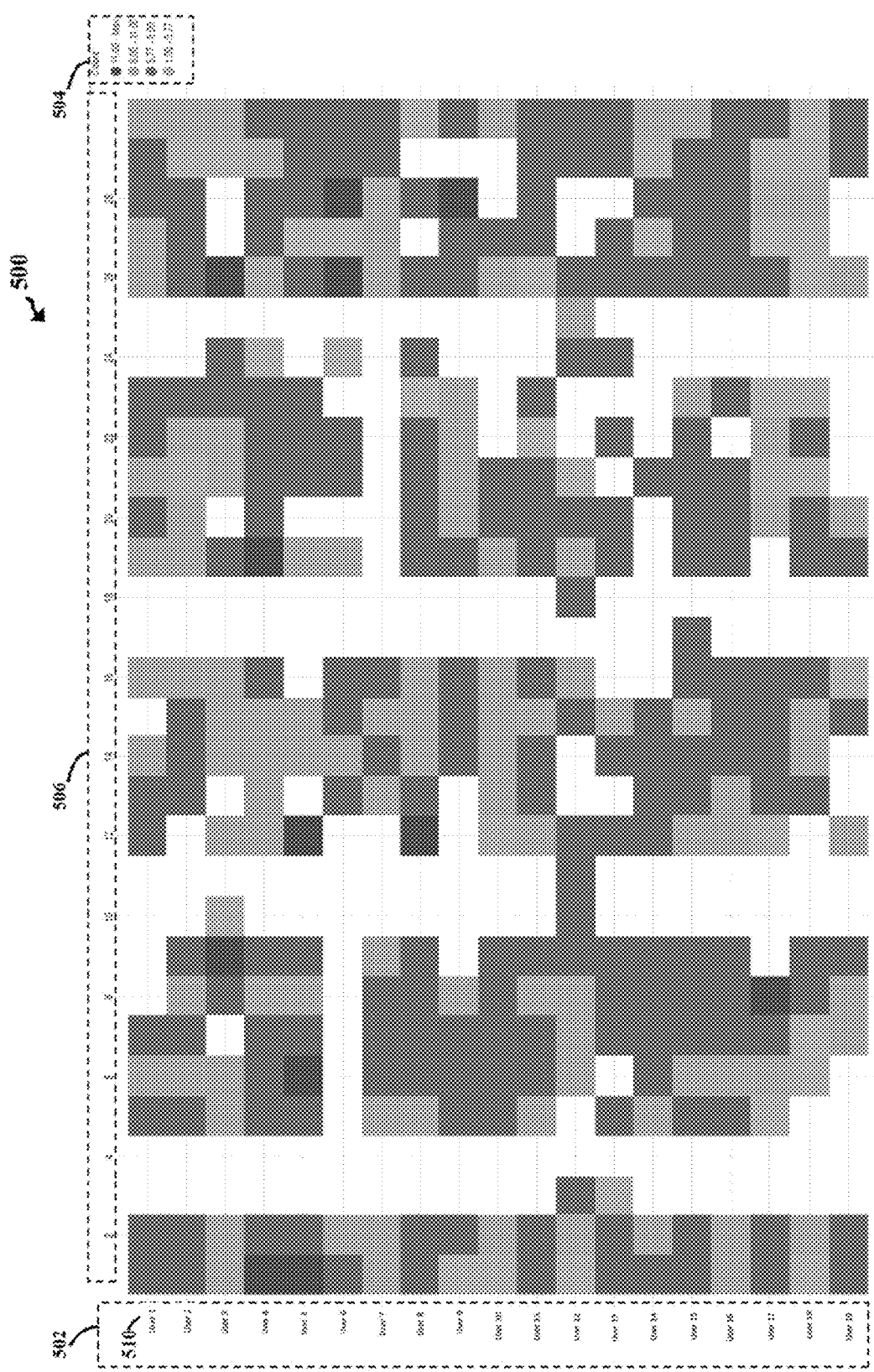
FIG. 5 illustrates an example of a heat map of users' work time, according to an embodiment.

FIG. 5 illustrates an example of a heat map 500 of users' work time during a month, according to an embodiment. The heat map 500 may include the user IDs (e.g., user account) 502 for different users, and the length of their work time for each day during a month 506. The different lengths of work time are represented by different indicators 504 in the figure. In some embodiments, the analytic server may use different colors or patterns as indicators. For example, a first indicator represents work time length in the range of 1 to 5.77 hours. A second indicator represents work time length in the range of 5.77 to 8 hours. A third indicator represents work time length in the range of 8 to 11 hours. A fourth indicator represents work time length more than 11 hours. The figure shows that most people work less than 8 hours or do not work on weekends (e.g., $3^{rd}$, $4^{th}$, $10^{th}$, $11^{th}$, $17^{th}$, and $18^{th}$ of the month). However, on the weekend of $24^{th}$ and $25^{th}$, people work more than usual, especially on the $24^{th}$, which may indicate that there is a project due soon. The figure also shows the length of work time for each user in each day. For example, in the first seven days, a first user (e.g., "User 1") 510 worked 5.77-8 hours in day 1 and day 2; zero hours in day 3 and day 4; 5.77-8 hours in day 5; 8-11 hours in day 6, and 5.77-8 hours in day 7.

Based on the figure, an administrator can easily see the length of each user's work time in each day during a certain period (e.g., each day within a month illustrated in FIG. 5). The administrator may use such data to better manage the workload and project schedules. The heat map may also allow an administrator to easily view user performances. The administrator can also gauge a user's activity with regard to a particular project and/or in relation to other users. Identifying the length of each user's work time may also be used by other software modules within an entity. For instance, the analytic server may transmit the hours worked by each user to a payroll software module where the payroll software module can use the results obtained via the methods and systems described herein to generate performance review or facilitate payments. In some embodiments, an application programming interface (API) may automatically transmit each user's respective work hours to another software module. Therefore, the work hours represented by the heat map may be used for reporting or other analytics purposes with little to no human intervention.

Non-Limiting Example

An entity administrator uses an electronic device (e.g., an administrator computing device) to access one or more servers of the entity (e.g., the analytic server). The administrator transmits a request to the analytic server to monitor each employee's computing device and identify/estimate time each employee was active and working. The analytic server may periodically monitor one or more accounts associated with each employees. For instance, the analytic server may monitor each computing device that accesses entity data using each employee's account (login identifiers) . The analytic server may also monitor any electronic device registered to each employee using one or more electronic identifiers, such as IP address, MAC address, and the like.

The analytic server may use methods and systems described herein to retrieve a list of events associated with each monitored electronic device. Events may indicate any interaction facilitated by each electronic device. For instance, an event ID may characterize and interactions between an electronic device and one or more servers, such as the analytic server. The analytic server may then use the methods and systems described herein to determine working time for each electronic device. To achieve this result, the analytic server my first identify two time periods (also referred to herein as patterns). The first pattern indicates that the user is logged on and "working." The first pattern may correspond to a time period where the number of login events exceeds the number of log off events. The second pattern indicates that the user is not "working" or not logged on. The second pattern may correspond to a time period where the number of log out events exceeds the number of log on events.

Using the events to identify the above-described patterns allows the analytic server to distinguish from interactions automatically executed by electronic devices and actions executed by the user. For instance, an electronic device operated by a user may automatically execute various protocols that may or may not be initiated by the user. Non-limiting examples of these events may include automatic software updates where an electronic device communicates with the server regardless of whether the user is logged on or off.

The analytic server may then identify various privileged events occurring during the above-described time periods. If privileged events (e.g., protocols executed by each electronic device) occur within the first time period (pattern), the analytic server may designate that time as "active" indicating that the user is "working."

Using the above described method, the analytic server may periodically and/or continuously monitor multiple employees. The analytic server may then generate and dynamically revise a graphical user interface (e.g., displayed on the administrator's computing device) that indicates active times per day for each employee, such as the GUI described in FIG. 5. The analytic server may continuously monitor different electronic devices and may The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method comprising:
periodically intercepting, by a server, data packets communicated between a computer of a user and a file server of an entity to generate a security log associated with interactions between the computer of the user and the file server;
identifying, by the server, a set of predetermined events for the user from the security log by parsing the security log based on event identifiers, the set of predetermined events corresponding to logon events, logoff events, and privileged events of operations on a privileged object in the file server;
determining, by the server, one or more patterns for the set of predetermined events during different time periods, where a first pattern corresponds to a number of the logon events being greater than a number of the logoff events during a first time period, a number of the privileged events occurring at least partially during the first pattern of the number of logon events being greater than the number of logoff events during the first period, and a first maximum difference between the number of the logon events and the number of the logoff events satisfying a first threshold, and
where a second pattern corresponds to the number of the logoff events being greater than the number of the logon events during a second time period and a second maximum difference between the number of the logoff events and the number of the logon events satisfying a second threshold;
determining, by the server, a starting point of the user's work time as a first time when the number of the privileged events satisfying a third threshold occur at least partially during the first pattern of the number of logon events being greater than the number of logoff events during the first period;
determining, by the server, an end point of the user's work time as a second time when the logoff events and the logon events diverge into the second pattern;
calculating, by the server, a length of work time for the user based on the starting point and the ending point of the user's work time; and
dynamically populating, by the server, a heat map indicating the length of work time of the user in a predetermined time interval.

2. The method of claim 1, further comprising:
retrieving, by the server, the security log from the file server, wherein the security log comprises records of security events on the file server.

3. The method of claim 1, further comprising:
generating, by the server, the security log by checking at least one of headers and payloads of the data packets.

4. The method of claim 1, wherein the file server generates the logoff events by closing logon sessions associated with the computer of the user after the user has been inactive for a predetermined period of time.

5. The method of claim 1, wherein the security log includes the logon events and the logoff events generated from automatic system refreshing and ticket updating.

6. The method of claim 1, wherein the privileged events indicate that the user is accessing shared folders in the file server.

7. The method of claim 1, wherein the file server comprises a domain controller that grants access to a number of computer resources of the file server.

8. The method of claim 1, further comprising:
determining, by the server, a correlation between user activities and the first and second patterns.

9. The method of claim 1, further comprising:
determining, by the server, a number of each predetermined event at a particular time based on an identifier and a timestamp associated with the respective predetermined event.

10. The method of claim 1, further comprising:
determining, by the server, project identifiers associated with the user during the user's work time.

11. A system comprising:
a computer of a user,
a file server of an entity,
a server in communication with the computer and the file server and configured to:

periodically intercept data packets communicated between the computer of the user and the file server of the entity to generate a security log associated with interactions between the computer of the user and the file server;

identify a set of predetermined events for the user from the security log by parsing the security log based on event identifiers, the set of predetermined events correspond to logon events, logoff events, and privileged events of operations on a privileged object in the file server;

determine one or more patterns for the set of predetermined events during different time periods, where a first pattern corresponds to a number of the logon events being greater than a number of the logoff events during a first time period, a number of the privileged events occurring at least partially during the first pattern of the number of logon events being greater than the number of logoff events during the first period, and a first maximum difference between the number of the logon events and the number of the logoff events satisfying a first threshold, and where a second pattern corresponds to the number of the logoff events being greater than the number of the logon events during a second time period and a second maximum difference between the number of the logoff events and the number of the logon events satisfying a second threshold;

determine a starting point of the user's work time as a first time when the number of the privileged events satisfying a third threshold occur at least partially during the first pattern of the number of logon events being greater than the number of logoff events during the first period; and determine an ending point of the user's work time as a second time when the logoff events and the logon events diverge into the second pattern;

calculate a length of work time for the user based on the starting point and the ending point of the user's work time; and dynamically populate a heat map indicating the length of work time of the user in a predetermined time interval.

12. The system of claim 11, wherein the server is further configured to:
retrieve the security log from the file server, wherein the security log comprises records of security events on the file server.

13. The system of claim 11, wherein the server is further configured to:
generate the security log by checking at least one of headers and payloads of the data packets.

14. The system of claim 11, wherein the file server generates the logoff events by closing logon sessions associated with the computer of the user after the user has been inactive for a predetermined period of time.

15. The system of claim 11, wherein the security log includes the logon events and the logoff events generated from automatic system refreshing and ticket updating.

16. The system of claim 11, wherein the privileged events indicate that the user is accessing shared folders in the file server.

17. The system of claim 11, wherein the file server comprises a domain controller that grants access to a number of computer resources of the file server.

18. The system of claim 11, wherein the server is further configured to:
determine a correlation between user activities and the first and second patterns.

19. The system of claim 11, wherein the server is further configured to:
determine a number of each predetermined event at a particular time based on an identifier and a timestamp associated with the respective predetermined event.

20. The system of claim 11, wherein the server is further configured to:
determine project identifiers associated with the user during the user's work time.

* * * * *